United States Patent [19]

Anand et al.

[11] 4,332,868

[45] Jun. 1, 1982

[54] HIGH TEMPERATURE BATTERY CELL COMPRISING STRESS-FREE HOLLOW FIBER BUNDLE

[75] Inventors: Joginder N. Anand, Clayton; Timothy T. Revak; Frank J. Rossini, both of Concord, all of Calif.

[73] Assignee: The Dow Chemical Company, Midland, Mich.

[21] Appl. No.: 939,156

[22] Filed: Sep. 1, 1978

[51] Int. Cl.³ .......................................... H01M 2/02
[52] U.S. Cl. .................................. 429/178; 429/104
[58] Field of Search ............................... 429/178, 104

[56] References Cited

U.S. PATENT DOCUMENTS

| | | | |
|---|---|---|---|
| 3,476,602 | 11/1969 | Brown et al. | 136/6 |
| 3,514,332 | 5/1970 | Minck | 136/6 |
| 3,749,603 | 7/1973 | Stringham et al. | 429/104 |
| 3,791,868 | 2/1974 | Compton et al. | 136/13 |
| 3,982,957 | 9/1976 | Jones et al. | 429/163 |
| 4,053,685 | 10/1977 | Rowley et al. | 429/68 |

*Primary Examiner*—Charles F. LeFevour
*Attorney, Agent, or Firm*—R. R. Stringham

[57] ABSTRACT

Thermal stressing of hollow fibers constituting the electrolyte-separator in a high temperature battery cell, and of certain other elements thereof, is avoided by suspending the assembly comprising the anolyte tank, the tubesheet, the hollow fibers and a cathodic current collector-distributing means, within the casing and employing a limp connection between the latter means and the cathode terminal of the cell.

15 Claims, 10 Drawing Figures

FIG_3

FIG_3A

FIG_4

HIGH TEMPERATURE BATTERY CELL COMPRISING STRESS-FREE HOLLOW FIBER BUNDLE

BACKGROUND OF THE INVENTION

High temperature batteries, such as sodium/sulfur batteries, in which the electrolyte-separator takes the form of a large number of hollow fibers are now well known. In discharge of such a sodium/sulfur battery cell, the anodic reactant, molten sodium, gives up electrons to an external circuit and forms $Na^+$ ions which migrate through the fiber walls to the catholyte. The cathodic reactant, molten sulfur, takes up electrons from the external circuit to form sulfide anions. The catholyte is thus converted to a mixture or solution of sodium polysulfide(s) with or in sulfur.

Hollow fiber batteries of this type, and methods of making them, are described in the following U.S. patents, the disclosures of which are incorporated herein by reference for all purposes which such references may serve:

| U.S. Pat. No. | Subject Matter |
| --- | --- |
| 3,476,602 | Hollow fiber type high-temperature batteries. |
| 3,672,995 | Hollow fiber electrolyte-separator materials. |
| 3,679,480 | Hollow fiber type electrical cell assembly. |
| 3,703,412 | Sequence of melting anolyte and catholyte. |
| 3,749,603 | $MoS_2$ coated foil as current collecting means in Na/S cell. |
| 3,765,944 | C-coated foil as current collector. |
| 3,791,868 | Method of making a battery cell having a coiled foil as a current collector. |
| 3,829,331 | Hollow fibers of sodium borate glass. |
| 3,917,490 | Method of grinding tubesheet glasses. |
| 4,050,915 | Cooling a nascent, melt-spun, hollow glass fiber. |

The prior art cells described in the above-listed patents preferably are hermetically sealed, but do not necessarily have to be closed by seals or welds requiring high temperatures for their formation. In fact, when such a cell is so insulated and heated that its upper end remains relatively cool during operation, the openings in the upper casing wall through which the leads pass, and/or which function as fill ports, can be sealed with materials such as pitches, tars or high-melting waxes. However, for the majority of commercial applications contemplated for high temperature batteries, it will not be very practicable to maintain different parts of the component cells at different temperatures. For this reason, and by reason of obvious safety concerns, a more permanent and reliable method of sealing, as by welding or use of solder glasses, is indicated.

The latter sealing methods are feasible but, in the rigid structures of the prior art, have been found to result in thermally induced stresses which can damage the tubesheet, the seals themselves and/or some of the fibers, which are relatively fragile. When forming welds or seals between the high melting or refractory materials of construction most suitable for high temperature battery cells, it is difficult to achieve a high degree of cross-sectional uniformity and to attain even cooling of the seals. Consequently, dimensional changes resulting in shifting of the inner assembly (anolyte cup, tubesheet, fibers and foil wraps; see drawings) within the casing and relative motion within the assembly itself tend to occur. If either of these movements is hampered, the resultant stresses can crack the seals or the tubesheet and/or break some fibers (usually just below the tubesheet).

It is not apparent from the literature (including patents) on the subject of high temperature batteries, that the preceding problem has been heretofore recognized. Niether has any method of constructing such batteries been described which would inherently avoid or remedy the problem.

OBJECTS OF THE INVENTION

It is a primary objective of the present invention to provide a configuration for high temperature battery cells which does not so restrain expansive/contractive motions, of or within the assembly comprising the fibers, that the seals, tubesheet or fibers are subjected to potentially damaging stresses.

A further object is to provide a battery cell which is improved with respect to the manner in which an inner assembly is disposed or positioned within the casing.

Another object is to provide a more rugged, hollow fiber type battery cell which is better adapted to commercial applications, such as in battery-powered vehicles.

A further object is to provide a battery cell in which an inner assembly is supportingly engaged with a wall of the outer casing and is electrically connected to the terminals of the casing but motion within or of the assembly as a result of temperature changes is essentially unhampered.

An additional object is to provide a high temperature battery cell which is improved in that the number of sealing engagements between dissimilar materials is reduced.

Another object is to facilitate construction of a hollow fiber type battery cell in which the weight of the cathodic current collecting means is transferred by a (non-conductive section of a) central core or mandrel to the tubesheet and does not stress the fibers.

An additional object is to provide a hollow fiber type battery in which the anolyte cup, the tubesheet and a non-conductive core section constitute a unitary body of essentially constant composition throughout.

Another object is to provide a method of fabricating hollow fiber type battery cells which satisfies other structural requirements without subjecting the inner assembly to stresses during or subsequent to formation of such seals as are required.

Yet other objects will be made apparent to those skilled in the art by the following specifications and claims.

SUMMARY OF THE INVENTION

The appended drawings will now be briefly described. FIGS. 1-4 are semi-schematics which depict four different embodiments of the invention, i.e., four different cells in which the inner assembly is engaged at one end, or around its middle, with a wall of the casing and is connected at one end, or at each end, through a limp link, to an electric terminal of the cell.

FIG. 1 is a semi-schematic plan view, looking down on a generally cylindrical cell of the invention which has not been charged with catholyte or anolyte. A vertical cross-section through line A—A of the figure is depicted in FIG. 1-A. FIG. 1-B depicts an enlarged view of a lower right hand part (encircled) of the vertical cross-section in FIG. 1-A. The cell of FIG. 1 consists of an external metallic casing fitted with electrical terminals and an inner assembly consisting of a metallic anolyte reservoir, a non-conductive tubesheet, a central core around which is disposed a hollow fiber bundle and a cathodic current collecting means, the latter being joined to the casing through a limp foil link and an intervening metallic tape coil. The lower portion of the casing is adapted to contain a body of catholyte which will surround the fiber bundle and occupy the unfilled spaces between the fibers.

FIGS. 2 and 2-A likewise depict in semi-schematic manner a cell similar to that of FIG. 1 but containing molten sodium (the anolyte) and a molten sodium polysulfide (the catholyte). In this embodiment, the limp link is a soft wad of a conductive fiber immersed in a molten sodium polysulfide. The anolyte tank is non-metallic and supports the tubesheet (and fiber bundle, etc.) through a non-conductive extension of the central core. The core section within the tank is hollow, has a perforated wall and contains a separate anodic current distributing means. The tubesheet, tank and non-conductive core section constitute a unitary body, the formation of which does not require seals between dissimilar materials.

FIGS. 3, 3-A and 3-B are semi-schematic and depict an unfilled, column-shaped cell of the invention in which the horizontal cross-section is generally square and of essentially constant size from top to bottom of the cell. FIG. 3C is a magnified view of a segment of a "ladder" comprising three spaced apart foil strips ("rails") and an alternating sequence of hollow fiber and wire lengths ("rungs") held in place by thin layers of fugitive cement. The fibers are open at one end and closed at the other end, and a length of spacer tape is disposed as an extra "rail" adjacent to but not touching the closed fiber ends. This ladder is rolled up on a mandrel (together with a bead of tubesheet paste) to form the lower half of the inner assembly of the cell. In this embodiment, the casing consists of an electrically non-conductive material, such as a glass or ceramic. The anolyte tank is metallic and has an upper, tubular section extending through and sealed to the casing, the tank body acting as the anodic current collector and its upper end acting as the anode terminal of the cell. The cathodic current collector is an array of wire lengths disposed between and generally parallel to the fiber lengths. The relative positions of the fibers and wires are maintained by the three coiled foil strips within the bundle and by a coil of a relatively thick, soft metal spacer tape below the fibers. The core is square in cross-section, is closed at both ends and, in this particular embodiment, is not engaged with the tubesheet. A cathode terminal post passing through and sealed to the bottom of the casing is engaged with a metal disc resting on the inner surface of the casing bottom. A powder of low-melting, otherwise suitable metal particles is disposed between the metal disc and the spacer tape coil, to act (when melted) as a limp connecting link in operation of the cell.

The cell of FIG. 4 is not depicted in horizontal cross-section or plan view, but may have either a circular or square cross-sectional shape (as in FIGS. 1 or 3).

Definition of Terms

As used herein, the terms listed below are intended to have the meanings stated:

Hollow Fiber: A capillary fiber having an outer diameter of about 6500 microns or less.

Cathodic and Anodic Terminals: The positive and negative poles, respectively, of the cell, when it is discharging.

Limp Link: A member which lacks stiffness; is not self-supporting. May be a body of liquid.

Fluid: A liquid, gas, vapor or froth.

Tight Contact: Contact of the type resulting when a flexible tape is wound, under tension, to form a coil.

Foraminous: As applied to the wall of a core section within the anolyte tank, a sufficiently open wall structure as to offer no substantial resistance to flow of the anolyte therethrough.

Inert: Not detrimentally reactive to an intolerable extent.

Anolyte: The body of material comprising the electrochemical reactant which provides electrons (to an external circuit) during discharge of the cell. May be synonymous with a reversibly consumable anode, as in the case of a molten alkali metal.

Catholyte: The body of material comprising the electrochemical reactant which accepts electrons (from an external circuit) when the cell is on discharge.

THE INVENTION DEFINED

The present invention is a battery cell and the method by which it is fabricated.

More precisely, the cell of the invention may be defined as:

a battery cell in which the electrolyte/separator is in the form of a plurality of hollow fiber lengths and the cell is so constructed that high temperatures may be employed in its fabrication or use without subjecting the cell components to thermally induced stresses of such magnitude as to damage them, said cell comprising:

a casing which is fitted with electrical leads adapted to function as positive and negative terminals of the cell and has top, bottom and side walls; and an inner assembly disposed in the casing and so engaged therewith that motion of the assembly therein is limited but motion of the assembly components as a result of thermally induced dimensional changes is not hampered, said assembly comprising:

(a) an upper member having the general shape of a bell or an inverted cup, the bottom edge of which is sealingly engaged with a fluid-impervious, electrically inert, generally disc-like, tubesheet having opposed, generally horizontal, upper and lower faces, said upper member and the tubesheet together defining a tank, (b) a bundle of said fibers, in generally parallel array, spaced laterally apart, and each having an open end and a closed end and consisting of a fluid-impermeable, electronically non-conductive, but ion conductive, material; said fibers passing generally vertically through and being sealingly engaged with said tubesheet body in such disposition that their open ends are coincident with or adjacent to said upper tubesheet face and communicate with said tank, their closed ends depending from said lower face, (c) a first current collecting/distributing means disposed in but not filling the spaces between said fibers and joined by a first connecting means to one of said leads, (d) a second current distributing/collecting means joined to the other of said leads by a second connecting means and so located that, when said tank is substantially filled with a liquid, the latter distributing means is in contact with the liquid, at least one of said first and second connecting means comprising a limp, electrically conductive link, said casing and upper member being adapted to prevent fluid communication between the tank interior and the portion of the casing interior external to said assembly.

A comparably precise definition of the method of fabricating the cell is deferred until later herein. However, said method may be summarily characterized as comprising such steps, in such sequence, that the expansive/contractive motions which result when the (anolyte) tank-to-casing and tank-to-tubesheet seals are formed are not so hampered as to detrimentally stress the seals, the tubesheet or the fibers.

It is a further advantage of the invention, both as a cell design and as a fabrication method, that incorporation of additional structural elements which better adapt high temperature battery cells for commercial operation is facilitated. That is, the essential concept of suspending the inner assembly within the casing and using at least one limp link between one of the current collecting/distributing means and the corresponding terminal(s) makes feasible—for example—the utilization of an extended core as a means of supporting the tubesheet so that it can take the weight of the (cathodic) current collecting and connecting means off the fibers and at the same time is less likely to sag upon prolonged operation of the cell at elevated temperatures. Similarly, utilization of a buoyant core to support a tubesheet against sag is facilitated.

The drawings are intended not only to illustrate specific embodiments, but also to exemplify various ways in which the separate cell elements may be altered and/or associated, without going outside the bounds of the invention.

In hollow fiber type battery cells, the material contained in the fibers must have a high electrical conductivity, since the current path is at least as long as the fibers. Thus, since a molten metal is a much better conductor than a solution in sulfur of the metal polysulfide(s), the anolyte (sodium) will generally be disposed inside the fibers in a sodium/sulfur cell of this type. However, the utility of the present invention is not restricted to operation with the anolyte inside and the catholyte outside of the fibers.

In the preceding description of the embodiments depicted in the drawings, the tank above the tubesheet was designated as an anolyte tank and the liquid in which the fibers would be (or are) immersed is designated as the catholyte. The current collecting/distributing means and cell terminals were correspondingly designated. This terminology is consistent with prior art disclosures of hollow fiber cells and was used to simplify the initial discussion of the drawings. However, the subsequent definition of the invention is not so limited and is directed to cells in which a suitable catholyte may be disposed on either side of the fiber wall and the anolyte disposed on the other side.

It should be noted that the term "current" is used herein in the conventional sense, as opposite in direction to electron flow. Whether or not current is being "distributed" or "collected" from the liquid above (or below) the tubesheet at any given time during operation of the cell of course depends on whether or not that liquid is the anolyte or catholyte and whether or not the cell is being discharged or charged.

Cell fabrication

Figures 1, 1A, 1B:
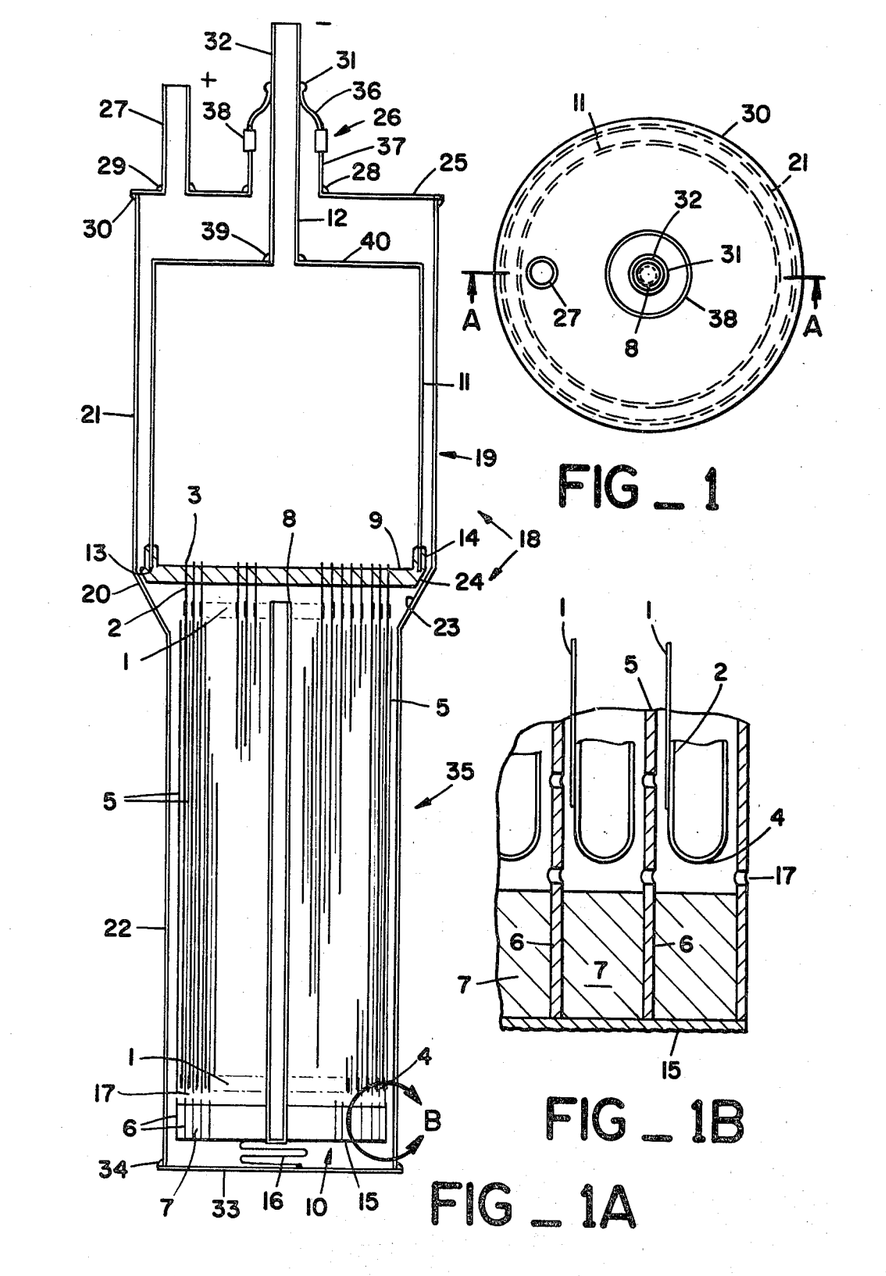

A representative sequence of cell fabrication steps (a through p) follows. Reference to FIGS. 1, 1-A and 1-B, wherein the individual cell elements are numbered, will be helpful to following the description. See also FIG. 3C.

(a) Hollow glass fibers are melt-spun, essentially as described in the above cited '915 patent. These are used to make long "ladders" in which two or more parallel, spaced-apart, thin, narrow, flexible foil strips (1) are "rails" and cut lengths (2) of fiber, open at one end (3) and sealed shut at the other end (4), and laid at right angles across the strips, constitute "rungs". The fiber lengths (2) are held in place on each strip by a thin layer of a thermally-degradeable or "fugitive" cement (not shown) such as ordinary rubber cement thinned with methylene chloride, for example. (The relative size (diameter) of the fibers is greatly exaggerated in all of the drawings except FIG. 1-B.)

A length of electrically conductive sheeting, such as a wide ribbon (5) of aluminum foil, is coated with carbon or $MoS_2$ as described in the above cited '944 or '603 patent, respectively. The ribbon is wider than a fiber length and has a thickness equal to from about 0.1 to 0.2 of the outer diameter of a fiber. It is positioned with respect to the fiber ladder so that, when they are rolled up together, the open ends of the fibers will extend beyond one lateral edge of the foil and the portion of the foil adjacent to the other edge will extend beyond the closed ends of the fibers as a "skirt" (6).

A flexible, conductive spacer tape (7), having a thickness at least equal to 1.1 fiber diameters, is provided, the width of the tape being somewhat less than the width of the foil skirt. This tape will usually be longer than the foil, to provide a tape end or tab that can later be used to form a limp connection to the casing bottom.

(b) The fiber ladder, foil and tape are rolled up together around a length of aluminum or stainless steel tubing (a mandrel) which is longer than the foil is wide and protrudes at one end of the developing roll. The tape is disposed in the roll so that one edge generally coincides with the skirt edge, thereby ensuring that the closed fiber ends (4) are spaced apart from the other tape edge. The protruding portion of the mandrel is not shown. At a later stage in the procedure, the latter portion is cut off and the tubing length then constitutes a central core (8) around which the portion of the assembly below the tubesheet is disposed.

A bead of paste—a viscous suspension of glass or ceramic particles in a fugitive medium (see the above cited '490 patent)—is applied to the fibers, adjacent their open ends, as they enter the nip of the developing roll. The successive spirals of the latter bead laterally cohere in the completed "jelly roll" to form a self-supporting disc which will constitute the tubesheet (9), when densified (cured).

The outermost wrap of the foil may be adhered at its end to the nearest underlying wrap by a thin layer of a suitable cement (such as the above described rubber cement) to form a sleeve which serves to protect the subjacent fibers during subsequent handling. The alternating wraps of foil "skirt" and spacer tape form a coil (10) which may be regarded as a laminated metal body, at one end of the roll, which is joined with the portions of the foil wraps between the fibers. (The foil wraps constitute a current collecting/distributing means and the laminated body—the coil—functions as part of a connecting means.) The core acts to a limited extent as a collector/distributor but its primary electrical role is as a supplemental portion of the connecting means.)

(c) The tubesheet-to-be is "green cured" by placing the sub-assembly comprising it in a sealed container and providing a means of condensing or absorbing the solvent vapors evolved from the cement(s) and the paste. In this way, the rate of drying is limited and the resulting green-cured disc is chalk-like and can be readily machined. Molecular sieves are a convenient means for absorbing the evolved vapors.

(d) If it is necessary to grind the edges of the disc, as to shape or size it, the protruding mandrel end can be used to hold the sub-assembly in a jig or chuck. It should be noted that it is considered generally advisable that care be taken to prevent uptake of moisture by the green-cured disc; such tubesheet compositions (see the above cited '331 patent) are considered hygroscopic.

(e) The green-cured disc is next "fired" or cured by heating the sub-assembly to degrade and/or remove the cement components and any remaining suspension medium and to fuse together the glass or ceramic particles in the disc to form a densified, unitary tubesheet member with which the fiber portions passing through it are bonded in sealing engagement. This is done by supporting the sub-assembly at the tubesheet periphery in an open pyrex container, which in turn is fitted closely within a closed metal casing, connecting the casing to a vacuum pump and placing the casing (and contents) in a furnace. The disc is heated, essentially by irradiation from and through the pyrex container, to a temperature of about 340° C. and kept at that temperature for about 2 hours. It is next further heated in the same manner, for about 4 hours at a final temperature which is about 15° above the glass transition temperature of the tubesheet material but well below the glass transition temperature of the fiber material, and is then allowed to (slowly) cool. With the solder-glass type of tubesheet materials disclosed in the above cited '490 patent, the final temperature will range from about 370° to about 400° C.

(f) A generally bell-shaped, aluminum or stainless steel member (11)—which in this instance may aptly be characterized as having the shape of an inverted funnel, by reason of comprising a tubular, upward extending section (12)—is prepared for sealing engagement with the tubesheet. (The tubular extension (12) is prejoined by weld bead (39) to the horizontal wall (40) or "top" of member (11). The "top" and side walls of (11) are shown formed as one piece, but could be separate pieces joined by welding.) The rim (13) of the lower portion of member (11) is immersed (with or without being preheated) in a body of molten tubesheet glass until the rim is essentially at the temperature ($\sim 700°$ C., for example) of the glass, then carefully withdrawn, together with a thin, adherent layer (14) of the glass, and allowed to cool slowly and evenly.

(g) The sub-assembly is supported (by the protruding mandrel end) with the tubesheet in a horizontal position and the glass-coated rim of member (11) is positioned essentially as shown in FIG. 1-A. The rim (and the adjacent wall section) of member (11) is induction heated by a surrounding, water-cooled coil of copper tubing connected to a source of radio-frequency, alternating current (a Lepel generator, for example). The heating is controlled so that the glass (or ceramic) coating on the rim and the portion of the tubesheet in contact with it reaches the sintering temperature of the glass. This temperature is maintained until the rim of member (11) has slightly penetrated the tubesheet and then the resulting seal is allowed to cool slowly. The anolyte (or catholyte) tank has now been formed.

(h) The sub-assembly is next subjected to a helium leak test to determine whether any fibers have been broken or the tubesheet is cracked. This is done with a commercial helium detector (a Varian, Model 925-40, mass spectrograph unit which can detect helium flows as small as $10^{-9}$ c.c. (measured at standard conditions) per second). The detector is connected by rubber tubing to the tubular portion (the "funnel stem") of the tank and helium gas is passed through the mandrel and radially outward, between the fibers and across the lower tubesheet face. If the rate of helium flow through the detector is so low ($<10^{-9}$ c.c./second) as not to be detectable, the sub-assembly is considered leak-free. (A typical helium flow when a leak results from imperfect bonding between the tubesheet and a fiber is about $10^{-7}$ c.c./second.)

(i) Several heli-arc weld beads (15) are run (see the above cited '868 patent) radially across the lower surface of coil (10) between the periphery of the surface and its juncture with the protruding portion of the mandrel, thereby locking the coiled foil skirt and tape wraps together and providing better electrical continuity to the mandrel. The protruding portion of the mandrel is then melted off just below its junctures with the inner ends of the weld beads.

(j) A perforation (17) is made through the skirt (6) of each wrap of ribbon (5), along each of several horizontal axes, by passing a needle point through the successive wraps along radii of the fiber/ribbon bundle between the closed fiber ends (4) and the upper edge of tape (7), thereby providing for subsequent charging of a liquid catholyte (or anolyte) to the spaces between the fibers not occupied by the ribbon wraps (5).

(k) A strip of foil, which may be a free end of the spacer tape or a separate length thereof, is heliarc welded to the coil (10) in such manner that it hangs freely from but is solidly connected thereto. The dependent strip now constitutes a limp connecting link (16) and the inner assembly (18) is essentially complete.

(l) The inner assembly is lowered into a stainless steel casing sleeve (19). The sleeve is open at both ends and includes a tapered wall section (20) which is intermediate of an upper, generally cylindrical wall section (21) of greater diameter and a lower, generally cylindrical section (22) of reduced diameter, thereby defining a generally frusto-conical inner surface (23). The assembly is lowered until the (conforming) peripheral surface (24) of the tubesheet (9) rests on surface (23). A stainless steel casing top wall (25), to which an insulating seal (indicated generally as 26) and a stainless steel tube (27) have been joined by weld beads (28) and (29) respectively, is slipped down over the tubular section (12) of member (11). The inner assembly is raised until tubesheet surface (24) is spaced apart from surface (23) a distance which is sufficiently less than the radial distance between the outer wrap of ribbon (5) and the casing wall (22) so that any lateral motion of the inner assembly will be stopped by contact between surfaces (23) and (24) before any portion of the assembly below the tubesheet touches the casing side wall. (The spacing between the latter surfaces should, however, be large enough to accommodate motions resulting from expansion and contraction of the cell components, and this in turn limits how closely the inner assembly fits in the lower part of the casing.) Weld bead (30), joining the casing top and side wall (25 and 21, respectively) is then formed.

(m) The upper part (36) of seal (26)—which is sized to fit closely thereto—is welded to the tubular section (12) of member (11), bead (31) being so formed. The inner assembly is thus suspended from the top wall of the casing; the upper end (32) of tubular section (12) and tube (27) are each adapted to function as both a fill port and an electrical terminal of the cell.

(n) The lower end of the foil strip (16) is welded to a stainless steel disc (casing bottom wall, 33). The strip is folded, without being creased, and disc (33) is welded to side wall section (22), bead (34) being formed. The unfilled cell (35) is now essentially complete.

(Seal 26 is prefabricated and consists of upper and lower iron/nickel/cobalt alloy (KOVAR ®) tubes (36 and 37, respectively) bonded to a hard glass insulator (38). Seals of this type have been obtained from Larson Electronic Glass Company, Redwood City, California.)

(o) Introduction of anolyte and catholyte to a cell of the type shown in FIGS. 1–1B may be illustrated by the following procedure, used when the anolyte is liquid sodium metal, disposed inside the fibers, and the catholyte is a liquid sulfur/sodium polysulfide solution disposed outside the fibers. The cell is first tested for leaks, essentially in the above described manner in which the sub-assembly was tested (step (h)), but with the helium being introduced through tube (27). It is then tested for internal shorts, transferred to a dry box, placed in a suitable heater and heated to a temperature within the range of 120°–150° C. The tubular section (12) of member (11) is utilized to evacuate the anolyte tank (defined by member (11) and tubesheet (9)), to charge molten sodium to the tank, and to repressurize it with an inert gas (Argon) to ensure complete filling of the fibers. Tube (27) is utilized to introduce molten sulfur to the space between the anolyte tank and the casing, wherein it runs down to the bottom of the casing and rises within the fiber bundle, through perforations (17), and outside the bundle, to a level sufficiently below the top of the core (3) to allow for the increase in catholyte volume which will result from passage of sodium through the fiber walls during discharge of the cell.

(Although sulfur is a very poor electrical conductor, it is not necessary to include any ionizable solute or conductive solids with it in order to initiate discharge of a hollow fiber type sodium/sulfur battery cell. Sulfur is a sufficiently good conductor and the sulfur layer between the fiber walls and the cathodic current collector is thin enough so that the cell can be started up simply by connecting it (at an appropriate operating temperature, such as ~300° C.) to an external load. The internal resistance will initially be high, but will decrease as discharge progresses. Thereafter, the cell ordinarily will not be recharged to such an extent that the catholyte does not comprise a substantial amount of sulfide.)

(p) The anolyte tank and casing can now be separately sealed by closing the ends of tubes (12) and (27), respectively. The magnitudes and signs of the pressure differentials across walls (11) and (21), after sealing is complete, obviously will depend on the pressure conditions maintained inside and outside of the (anolyte) tank when the closures are effected. Either space may be partially or wholly evacuated or may be pressurized (at the normal working temperature of the cell) with an inert gas. A convenient closure method, when the seal is to be made at ambient pressure, is to braze or solder a pre-tinned plug in the tubing end. If the sealed space is to be held under sub-ambient pressure, the tubing may be closed by pinching it off while connected to a source of vacuum, and then soldered in addition.

The order of the last several steps in the preceding sequence can be varied and some of the steps can be modified, particularly if the casing used is of essentially constant diameter from top to bottom. For example (referring still to FIGS. 1–1B), if care is taken to ensure proper positioning, the sub-assembly consisting of members (25), (26) and (27), can be sealed to the tube (12) before the (inner) assembly is disposed in the casing sleeve. When this is done, the assembly may be supported either at the upper end (32) of tube (12) or at the tubesheet edge and the sub-assembly supported in such manner that it is free to move as necessary to accommodate any minor misalignment that occurs during formation of the sealing bead (31).

Similarly, if the diameter of the lower casing section (22) is at least as large as the diameter of the upper section (21), the sub-assembly (25)–(27) can be first welded to the casing sleeve (19) and then the inner assembly drawn (by means of a suitable tool releasably engaged within tube (12)) into the casing sleeve at its open bottom and up into position; bead (31) then being formed. If desired, bottom wall (33) can be welded to (or otherwise conductively engaged with) the lower end of tape length (16) before the assembly is drawn fully into the casing sleeve.

The latter alternative can also be varied so that the assembly is positioned within the sleeve, the casing bottom is joined to the end of tape (16) and then welded to the sleeve end, and the sub-assembly (25)–(27) is lowered into place (around an extension of the tool engaged within tube (12)) at the top of the sleeve and welded thereto. Bead (31) is then formed.

Step (j) can, in effect, be carried out before step (a), by selecting as the foil ribbon one which is perforated at spaced intervals along a line a little further from the ribbon edge than the width of the spacer tube. (The foil also may be perforated in any desired pattern "above" the latter line.)

Figures 2, 2A:
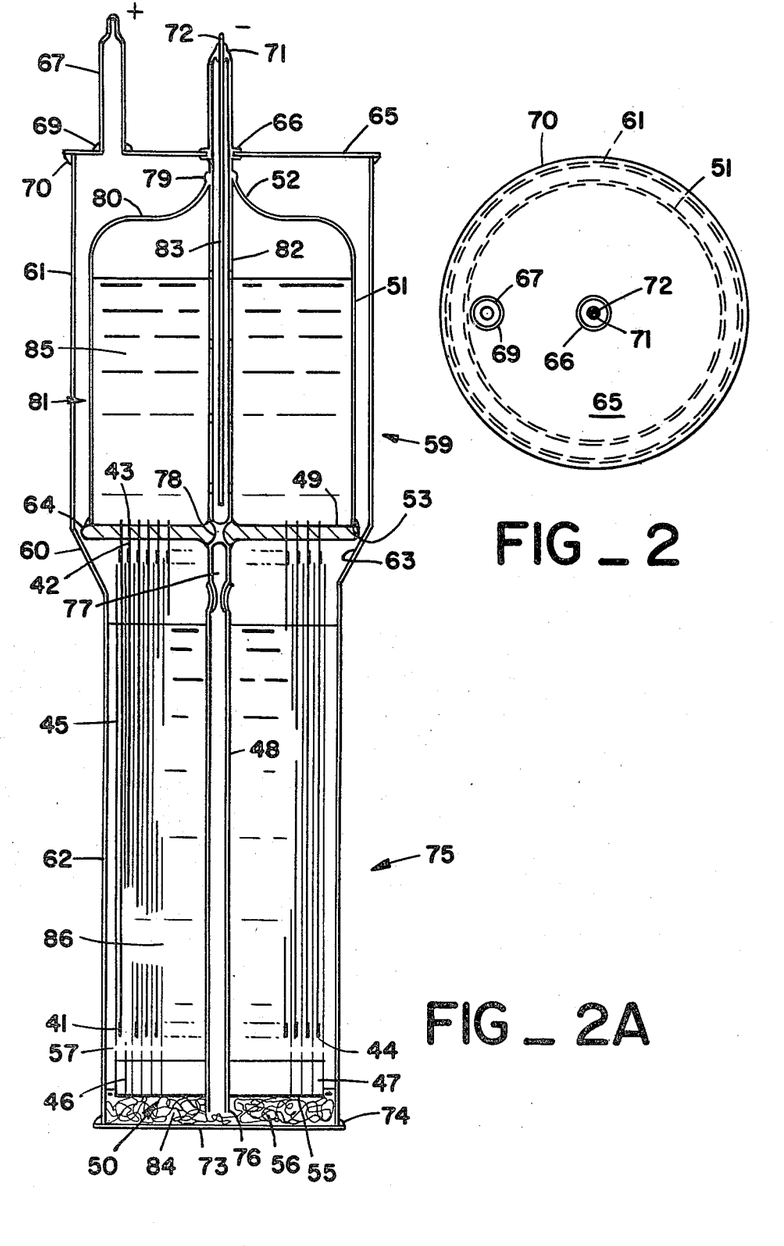

Turning now to the cell of FIGS. 2 and 2A, elements 41–80 generally correspond to elements 1–40 in FIGS. 1–1B. The lower portion of the inner assembly is formed in essentially the same manner from a "ladder" of foil strips (41) and fiber lengths (42) having open and closed ends (43 and 44, respectively), a wide, carbon or $MoS_2$-coated foil ribbon (45), a spacer tape (47) and a hollow metallic core (48). The coil (generally indicated as element (50)) is formed of the alternating wraps of the foil skirt (46) and tape (47). The lower end (76) of the core protrudes from the coil and is solidly connected to it by radial weld beads (55) across the lower surface of the coil. The upper end of the core (48) is locked to the lower end of a non-conductive tube (77) which extends through the tubesheet (49) and includes a necked-in section (78) with which the tubesheet is fused. The tubesheet constitutes the bottom of a carboy-shaped, non-conductive tank (indicated generally as 81) having side walls (51) and a top-wall (80) terminating in a neck (52). The tube (77) includes a (hollow) upper section (82) which extends through and is sealingly engaged with each of necks (52) and a metallic casing top wall (65). The portion of tube section (82) within tank (81) is foraminous and contains a metallic conductor (83) which extends, in sealing engagement therewith, through the top end of tube section (82); the protruding portion (72) of conductor (83) constitutes a first (anodic) terminal of the cell. Tube (67) is joined by weld bead (69) to casing top (65); it is closed at the top and constitutes a second (cathodic) terminal of the cell. The casing top (65) is joined by weld bead (70) to the upper section (61) of the casing sleeve (indicated generally as element 59) and the lower section (62) of the sleeve is joined by weld bead (74) to the bottom wall (73) of the casing. The peripheral surface (64) of the tubesheet (49; i.e., the tank bottom wall) is spaced apart from the inner surface (63) of an intermediate, frusto-conical section (60) of the casing side wall or sleeve (59). A soft wad (56) of a conductive fiber, such as graphite or carbon-coated aluminum, is disposed in light contact with each of coil (50), core end (76) and casing bottom (73) and is immersed in a body (84) of a relatively low-melting sodium polysulfide, such as $Na_2S_5$, disposed at the bottom of the casing. Tank (81) (and the fiber interiors—not separately numbered) contain a body (85) of sodium metal. The normal working locus of the catholyte, i.e., the spaces between the fibers (42) and the foil wraps (45) and the "dead" space between the outermost foil wrap and the adjacent portion (62) of casing (59), contain a body (86) of sulfur or sodium polysulfide and are connected by perforations (57) in the foil skirts (46). The interior of the metallic core section (48) communicates through its open end, with polysulfide liquid (84).

The procedure for assembling the cell of FIGS. 2 and 2A is generally the same as that described for the cell of FIGS. 1–1B. However, certain of the steps differ in several respects.

In step (b), the mandrel on which the fiber and foil "jelly-roll" of FIGS. 2, 2-A is formed, and from which core (48) is derived, includes not only a lower extension which protrudes from the bottom of the jelly roll and is later cut off, but is also crimped at its upper end around a conforming lower end of a tube (77) which has been preformed with an intermediate, necked-in section (78) and a foraminous upper section (82) and consists of the same material as the particles in the tubesheet paste. Section (78) is necked-in as much as possible, i.e., until the tube interior is closed off at that point, in order to avoid cracking at the tubesheet and tube juncture as a consequence of shrinkage when the tubesheet disc is dried and cured. For the same reason, the size distribution for the solid particles in the tubesheet paste is controlled (in accordance with well-known principles) to minimize the liquid vehicle content therein and to maximize the packing density in the disc after it has been "green cured" in step (c).

Step (f) is omitted, since the generally bell-shaped member (51) is preformed from the same material as the tubesheet and its rim (53) does not have to be coated with glass.

Step (g) is essentially unchanged but the rim of member (51) simply bonds with the peripheral portion of the tubesheet and any "penetration" which occurs will be insignificant.

Neck (52), appropriately sized to fit closely to tube section (82), is fused to it (as with a carbon-monoxide torch) to form a ring joint (79) of a well known type. This joint corresponds to the preformed weld bead (39) in the cell of FIGS. 1–1B.

Step (k) is omitted, since the limp link will be provided subsequently, i.e., in a modification of step (n).

The sealing operations of steps (l) and (m) are modified. Seal (71) includes a glass to metal joint which is formed after conductor (83) is disposed in tube section (82), following introduction of (molten) sodium to tank (81) through tube section (82). The latter conductor preferably is easily deformable and is coated below its upper end (72) with a bead of the tubesheet glass before being inserted in tube section (82). The seal (71) is then completed between the bead and the adjacent portion of tube section (82,) by heating, and allowed to cool slowly. The conductor can be placed in the tube section and seal (71) formed before the "jelly-roll" is built up on the mandrel, if the portion of tube section (82) between seals (66) and (71) is first joined to a glass side extension which can later be used as a sodium fill port and then closed. Seal (66) also includes a metal to glass joint and preferably is made before top wall (65) is welded to the casing sleeve. The seal is made by forming an appropriate opening in top wall (65), coating the lip of the opening with tubesheet glass, positioning the top wall with respect to tube section (82) and completing the seal by fusing the coating with the tube wall.

Next, top wall (65) is welded to the upper casing sleeve section (61), bead (70) being formed.

Step (n) is modified by placing the soft fiber wad (56) between casing bottom (73) and the lower surface of the coil (50) and welding the bottom (73) to the lower casing sleeve section (62). The wad is sized to be under very slight compression when so enclosed and functions similarly to the tape end (16) which is the limp link in the cell of FIG. 1A. As shown in FIG. 2A, the voids within the fiber wad are occupied by a polysulfide material, such as $Na_2S_5$, which melts at a temperature ($\sim 252°$ C.) well below the contemplated operating temperature ($\sim 300°$ C., for example) of the cell.

The fibers constituting the wad are not joined to the bottom of the coil or to the casing bottom and the polysulfide will not function to any substantial extent as an electrical conductor. However, the contact between the wad and the metal surface above and below it will be adequate and it is preferable that the void spaces in the wad be filled by polysulfide, rather than by sulfur.

Step (o) is modified to the extent that the polysulfide (84) is introduced (through tube (67)—not yet closed) to the casing interior before the sulfur (86) is introduced.

Several variations can be made in the cell of FIGS. 2 and 2A. The major portion (82) of tube (77) which is above the tubesheet can be a length of metal tubing engaged with the upper end of a somewhat extended non-conductive intermediate portion of tube (77). Also, the core (48) itself may be non-conductive; that is the core may simply be a downward extension of the (non-conductive) section of tube (77) which passes through the tubesheet.

If the upper tube section (82) is made of metal, conductor (83) is eliminated and seal (52) is no longer a simple glass-to-glass ring joint but is made by first forming a glass to collar on the metal tubing and then fusing the collar to neck (52). Seal (71) is replaced by a simple metal tube closure and seal (66) can be the insulating type of seal (26) used in the cell of FIGS. 1–1B. It is of course necessary, in the latter case, to engage the upper and intermediate sections of tube (77) in such manner (a sliding engagement, for example) that the length of the metal section can change to a limited extent without stressing the tubesheet (etc.). This requirement can only be met so long as the tubesheet does not sag substantially below its original position. Accordingly, this variation is considered less desirable for larger diameter cells in prolonged service.

In another variation, the portion of tube section (82) within the anolyte tank is eliminated and the rest of tube section (82) is simply (is replaced by) an upward tubular extension of the neck (52) of member (51). The latter extension is closed at its top (outer) end and engaged with the top (72) of conductor (83) by seal (71).

Figures 3, 3A:
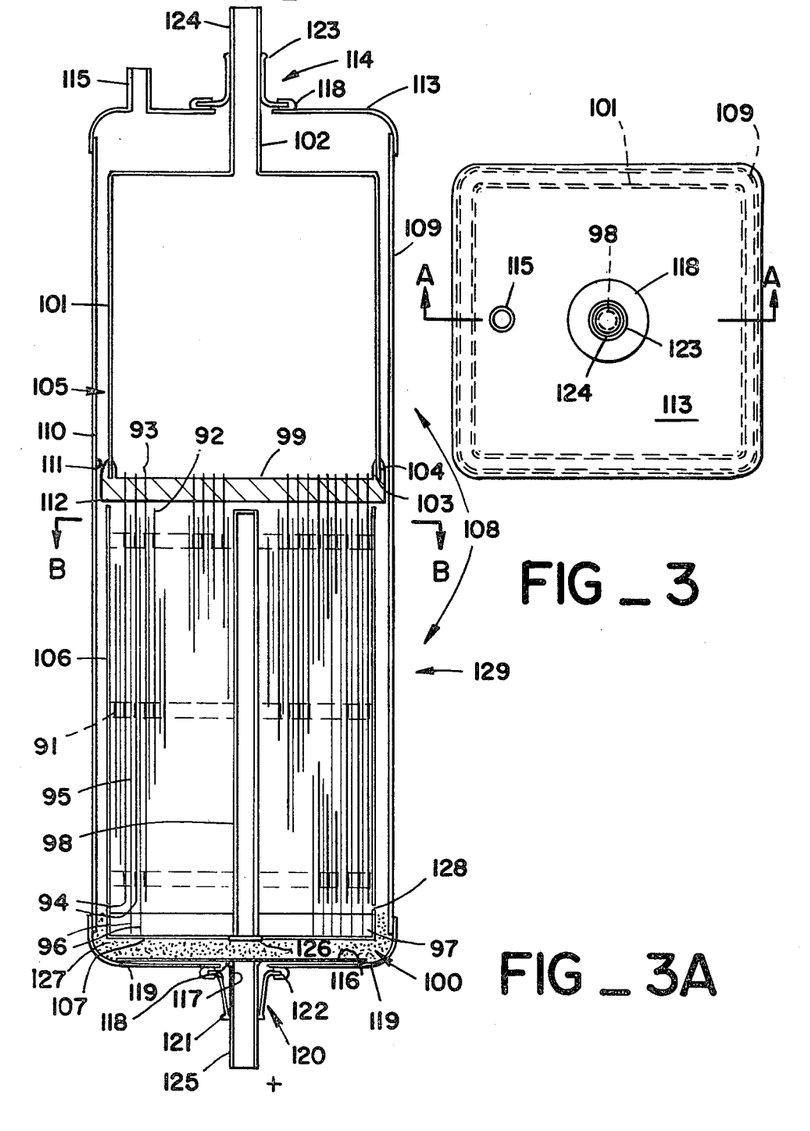
FIG. 3 is a top view, in plan.
FIG. 3A is a vertical cross-section taken through line A—A in FIG. 3
Figure 3B:
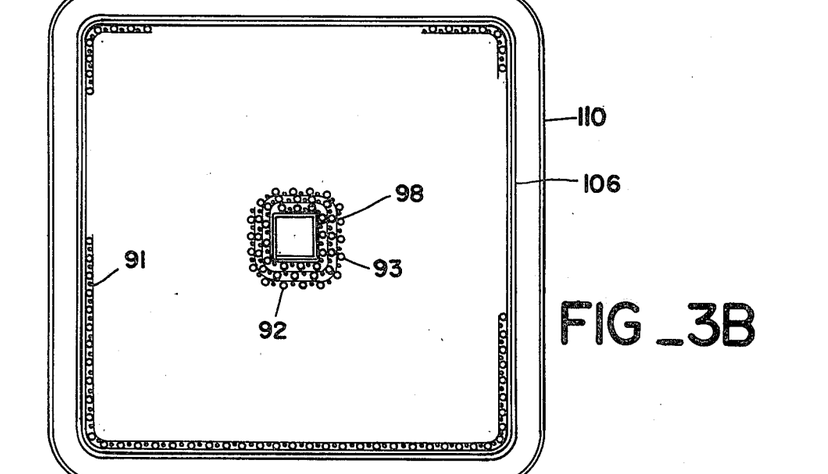
FIG. 3B is a horizontal cross-section (of the entire cell, viewed from above) through line B—B in FIG. 3A.
Figure 3C:
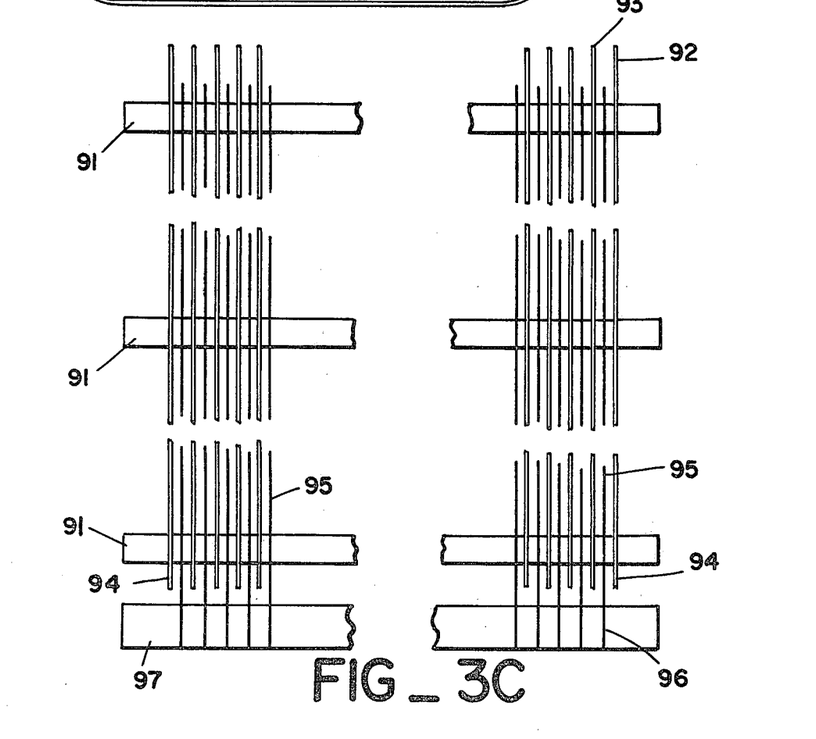

Referring now to FIGS. 3–3C, the elements of the cell shown are cataloged below. Elements 91–117 correspond to elements 1–27 in FIG. 1-A.

| Element | Number |
|---|---|
| Aluminum foil strips | 91 |
| Hollow fiber lengths | 92 |
| Open fiber ends | 93 |
| Closed fiber ends | 94 |
| Lengths of wire | 95 |
| Lower end portions of wire lengths | 96 |
| Wraps of spacing tape | 97 |
| Aluminum core of square cross-section, closed at both ends | 98 |
| Tubesheet | 99 |
| Tape and wire-end coil (indicated generally) | 100 |
| Inverted, funnel-shape, aluminum cup | 101 |
| Upward extending tubular portion of cup | 102 |
| Rim of inverted cup | 103 |
| Coating of glass on rim, fused to tubesheet | 104 |
| Anolyte tank (indicated generally) | 105 |
| Metal sleeve around fiber (etc.) bundle | 106 |
| Metal disc welded to bottom of tape coil | 107 |
| Inner assembly (indicated generally) | 108 |
| Glass or ceramic casing side walls | 109 |
| Intermediate section of casing side wall | 110 |
| Interior surface of element 109 | 111 |
| Peripheral surface of tubesheet | 112 |
| Casing top wall | 113 |
| Seal (top) | 114 |
| Fill port | 115 |
| Conductive metal disc | 116 |
| Metal tubing length | 117 |
| Weld bead | 118 |
| Casing bottom wall | 119 |
| Seal (bottom) | 120 |
| Silver solder bead | 121 |
| Glass/metal joint | 122 |
| Weld bead | 123 |
| Negative cell terminal (on discharge) | 124 |
| Positive cell terminal (on dishcarge) | 125 |
| Cap closure at lower end of core | 126 |
| Thin layer of powdered, low melting metal | 127 |
| Perforations through catholyte cup wall | 128 |
| The complete cell (indicated generally) | 129 |

The procedure for assembling the cell of FIGS. 3–3C is similar to the procedure outlined for the cell of FIGS. 1–1B, but differs as follows.

In step (a), the conductive sheet is replaced by a plurality of generally parallel lengths (95) of wire, such as molybdenum wire or an aluminum wire coated with carbon or $MoS_2$. The lower ends (96) of the wire lengths, which extend across spacer tape (97) in the "ladder" of FIG. 3-C, differ from the foil "skirts" (6) in FIG. 1-A in an obvious manner and the roller up coil (100) is a more open structure. Also, no tape end is provided, since other means are used to provide a limp link (127).

In step (b), the mandrel (from which core (98) is derived) is closed at the upper end, is square in cross-section and is sufficiently large in "diameter", in comparison to the fiber size, and the number of wraps in the "jelly-roll" are such, that the roll generally retains the square cross-section (see FIG. 3B). Since there is no foil wrap around the roll, a somewhat stiff, metal sleeve (106) of square cross-section, sized to fit closely to the roll, is very carefully slipped up around the roll to protect the fibers and to subsequently limit upward motion of the coil, core, etc., relative to the tubesheet.

Step (i) is modified in several respects. The heliarc weld beads (not shown) are extended to join with the lower edge of sleeve (106). Then a square, conductive metal disc (107; see FIG. 3A) having a square hole at the center is slipped onto the protruding mandrel end (not shown), raised up against the coil bottom and welded to both the mandrel and the sleeve (106) (weld beads not shown).

The protruding portion of the mandrel is cut off a short distance below coil (100) and the stub is covered with a shallow square cap (126) which is then welded around its periphery to disc 107. (The hollow core is essentially empty (evacuated or gas-filled) and provides buoyancy, after catholyte is charged to the cell, to counteract the weight of the core material, coil and wires; the distance between the top of the core and the tubesheet is less than the distance between the closed fiber ends and the coil but is somewhat greater than the distance from the tubesheet periphery to the top edge of the sleeve (106)).

In step (j) there are no foil wraps to perforate but perforations (128) are made through sleeve (106) at a level between the closed fiber ends and the coil, to permit entry of catholyte to the fiber (etc.) bundle even when the top edge of sleeve (106) is in contact with the tubesheet. Step (k) is omitted.

Steps (l) and (m) are modified in several respects. The casing consists of glass or ceramic and the casing top wall (113) is fused to the casing side walls (109) and the top seal (114) is joined to the top wall (113), before the inner assembly (108) is disposed in the casing. The latter assembly is drawn—by a suitable tool releaseably engaged with the interior of tubular section (102)—into the casing at its bottom and up into position such that the upper end (124) of member (102) protrudes a preselected distance above seal (114). Care is taken in this operation to ensure that the core, coil (etc.) does not move further from the tubesheet and that the vertical axes of members (102) and (114) are essentially coincident. The latter two members are joined by a weld bead (123). (Seal (114) includes a glass to metal joint (118) formed by precoating the lower lip of the seal with glass and then fusing the glass to the casing top wall (113).)

The lateral spacing between the tubesheet peripheral surface (112) and the interior surface (111) of sidewall section (110) is substantially less than the spacing between the sleeve (106) and side walls (109), thereby ensuring that gross lateral motion of the inner assembly will be arrested before the fibers are subjected to any torque, without hindering expansion/contractive motions.

In step (n), the bottom wall (119) of the casing is fused to the sidewalls (109) before the limp link is formed. First, however, lower seal (120) is joined (as above) through a glass to metal joint (122) to bottom (119), and tubing length (117) is joined by weld bead (118) to metal disc (116) and inserted through the seal as shown. Then the casing bottom is joined to the casing walls and the limp link is formed by introducing a sufficient amount of powdered metal particles through fill port (115) (and shaking them down) to form (when melted) a thin, liquid layer contacting both the coil (100) and the disc (116).

The unfilled cell (indicated generally as (129)) is now complete and may be charged with catholyte (through fill port (115)), the space between the casing and the sleeve (106) and through perforations (128) near the bottom of the sleeve. As the catholyte level within the fiber (etc.) bundle rises, the closed, hollow core (98)—if of sufficient volume—will tend to rise, taking with it the wires, the coil (100), sleeve (106) and disc (107). However, the top edge or rim of sleeve (106) will—by design—contact the tubesheet bottom before the top of the core does (even through the core has expanded to the length it has at the working temperature of the cell). This disposition will not be altered when the catholyte volume is further increased, either by adding more catholyte initially or by discharging the cell. Optionally, the core may be so sized and positioned and made of such a material that, when it is fully expanded, its top is so close to the tubesheet that any substantial sagging of the tubesheet will be resisted by the net buoyant force on the core.

After the catholyte is charged to the cell, port 115 may be fused shut.

The tubular extension (102) can be used as a fill port for introduction of anolyte to the cell and then closed. The upper portion (124) of member (102) then will function as the upper cell terminal (the negative terminal, on discharge, for example). The lower portion (125) of tubing length (117) will function as the lower (+) terminal of the cell and may be left as shown or closed.

Figure 4:
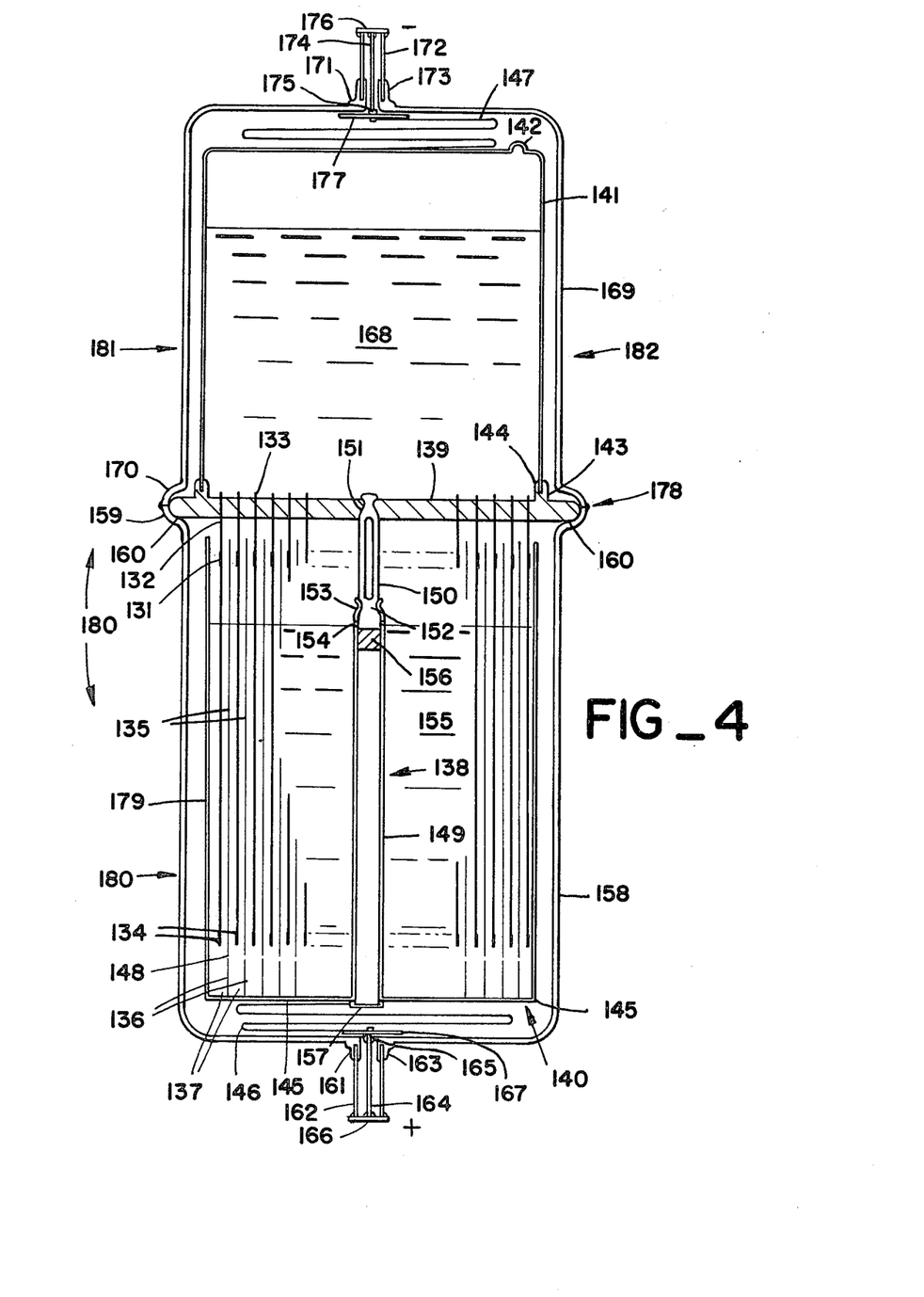
FIG. 4 is a semi-schematic which depicts—in vertical cross-section—an embodiment of the invention in which the inner assembly is positioned and supported in the casing by contact along an equatorial line, and each of the connections between the assembly and the anode and cathode terminals includes a limp (foil) link. The periphery of the tubesheet extends "radially" out of the assembly as a ridge or lip and is (slidingly) engaged with the surface of a conforming groove in the casing side wall. The casing is glass or ceramic, the anolyte cup is metallic and the weight of the non-fiber components below the tubesheet is transferred to the tubesheet by a central core which (a non-conductive portion of) is integral with the tubesheet. A liquid-tight catholyte cup is disposed around the portion of the assembly below the tubesheet.

Turning finally to FIG. 4, the elements numbered 131-148 correspond to elements 1-17 in FIG. 1-A. All of the cell elements are cataloged in the list below.

| Element | Number |
| --- | --- |
| Aluminum foil strips | 131 |
| Fibers | 132 |
| Open fiber ends | 133 |
| Closed fiber ends | 134 |
| Wraps of foil ribbon | 135 |
| Skirt portions of (135) | 136 |
| Wraps of spacer tape | 137 |
| Core (indicated generally) | 138 |
| Tubesheet | 139 |
| Coil (generally indicated) | 140 |
| Inverted anolyte cup | 141 |
| Sodium fill port (closed) | 142 |
| Rim of anolyte cup | 143 |
| Glass coating | 144 |
| Conductive metal disc at coil bottom | 145 |
| Limp (metal foil) link (bottom) | 146 |
| Limp (metal foil) link (top) | 147 |
| Perforations in foil skirts (136) | 148 |
| Metallic section of core (138) | 149 |
| Non-conductive section of core (138) | 150 |
| Necked-in upper end of (150) | 151 |
| Necked-in lower end of (150) | 152 |
| Crimped end of (149) | 153 |
| Perforations in (149) | 154 |
| Sulfur | 155 |
| Plug in upper end of (149) | 156 |
| Cap | 157 |
| Lower casing section | 158 |
| Flared and radiused rim of (158) | 159 |
| Shoulder | 160 |
| Thickened lip of hole in bottom of lower casing section (158) | 161 |
| Tubing length (metal) | 162 |
| Glass coating on end of (162) | 163 |
| Rod | 164 |
| Bulge near end of rod | 165 |
| End closure | 166 |
| Connection plate | 167 |
| Sodium | 168 |
| Upper casing section | 169 |
| Flared and radiused rim of (169) | 170 |
| Thickened lip of hole in top of (169) | 171 |
| Tubing length (metal) | 172 |
| Glass coating | 173 |
| Rod | 174 |
| Bulge near end of rod | 175 |
| End closure | 176 |
| Connection plate | 177 |
| Bulged equitorial casing joint (indicated generally) | 178 |
| Sleeve around fiber (etc.) bundle | 179 |
| Inner assembly (indicated generally) | 180 |
| Completed casing (indicated generally) | 181 |
| Completed cell (indicated generally) | 182 |

The procedure for assembling the cell of FIG. 4 corresponds generally to that described for the cell of FIGS. 1-1B. The same type of (cathodic) current collector, a wide ribbon of foil, is employed. The core (138) comprises a lower, metallic section (149) and a pre-formed, non-conductive upper section (150) having necked-in top and bottom ends, (151) and (152) respectively. The upper end (153) of core section (149) is crimped around the lower end (152) of core section (150).

In step (a) of the procedure, the spacer tape does not include a free end, since a separate tape length will subsequently be provided to form limp link (146).

In step (b), the protruding portion (not shown) of the mandrel and section (149) of core-to-be (138) are contiguous and are open from the crimped end (153) down. The bead of tubesheet paste is started at the upper end (151) of the mandrel so that the tubesheet will be integral with the non-conductive core section (150).

Step (f) differs in that the (inverted) anolyte cup (141) is not extended by a tubular section which is to pass through the cell casing. Instead, a tube length (not shown as such) which will function as a fill port and then be pinched off and closed to form element (142), is extended from the "top" of cup (141).

The sequence of steps (i) and (j) is reversed. That is, perforations (148) through the foil skirts (136) are formed before step (i) is carried out.

In step (i), after the heli-arc weld beads (not shown) have been formed across the bottom of the coil (140), a metal sleeve (179) is slipped up around the outer wrap of foil ribbon (135). Then a metal disc (145) having an appropriately shaped hole at the center is slipped onto the protruding mandrel end (not shown), raised up against the coil bottom and welded to the mandrel and to the lower edge of the sleeve (weld beads not shown), thereby forming a fluid-tight catholyte cup (not separately numbered).

In step (k) two soft metal tape lengths, (146) and (147) respectively, are welded at one end to the top of the anolyte cup (141) and to disc (146), as shown.

Step (o) is now performed out of sequence. That is, the anolyte and catholyte cups are filled before the casing is formed around the inner assembly. The assembly is supported at the tubesheet periphery and a heating coil, consisting of two, hinged sections enveloped in insulation, is closed around each of the cups (within an enclosure having an inert atmosphere and equipped with remote manipulator). Molten sodium is charged through the fill tube (not shown as such), which is then largely removed and the remaining stub (142) fused shut as shown.

The protruding mandrel end (not shown) is connected to a source of molten sulfur (for example), which is then caused to flow, in a predetermined amount, up through the mandrel, out through perforations (154), down between the mandrel and the adjacent wrap of the foil ribbon, horizontally through perforations (148) and up through the spaces between the fibers and ribbon wraps, to a level slightly above perforations (154). The sulfur source is depressurized and the mandrel drained until no more sulfur can flow back into perforations (154).

The mandrel end is cut off a little below disc (145) and a close-fitting, graphite-coated, aluminum, sealing plug (156) is pushed up through the mandrel (now the core (138)) to a level just below perforations (154). A shallow cap (157) is then placed over the mandrel stub and soldered or laser welded (bead not numbered) to disc (145). Since core section (149) now contains a trapped body of (inert) gas, no catholyte can enter it.

The inner assembly is now not only complete, but is also charged with anolyte and catholyte—which are kept molten throughout the rest of the cell assembly procedure.

Step (n) is completed before steps (l) and (m). That is, the limp links are connected to the casing (halves) before the inner assembly is disposed therein. Each of casing "halves" (158) and (169) is end-fitted with an open length of aluminum tubing, (162) and (172) respectively (which will function as terminals of the cell) in the following manner. An appropriately sized hole, the lip (161) of which is thickened and bulges out, is formed in the bottom wall of the lower casing "half" (158). Tubing length (162) is dipped in molten glass (the same material the casing consists of, for example) to form a coating (163) and is inserted in the hole and sealed in place by fusing the glass coating to the lip of the hole. (Tubing length (172) is likewise provided with an end coating (173) and sealed in place in the top of casing half (169) by fusion of the coating with lip (171).)

An electrical connection between each of tubing lengths (162) and (172), respectively, and the free ends of tape lengths (146) and (147), is made next (the tapes being extended to full length). A metal rod (164) with a preformed, annular bulge (165) near one end is welded at the other end to a metal disc, or end-closure (166) and inserted in tubing length (162) as shown. The disc (166) is edge-welded to the end of tube (162). A connecting plate (167) having a hole at its center is slipped onto the end of rod (164), against bulge (165) and spot-welded to the adjacent rod end. A hole is punched in the free end of tape (146), which is then slipped over the rod end and welded to it (and to plate (167)). In the same manner, the sub-assembly of elements (174)–(177) is formed and connected to elements (172) and (147), to complete the anodic connection within casing "half" (169). A limp connecting link has now been formed at each end of the (as yet not fully assembled) cell.

Cell assembly steps (l) and (m) are completed as follows. The heating coils around the anolyte and catholyte cups are removed, the support at the tubesheet edge is removed and the lower casing "half" (158), which has a flared and radiused rim (159) defining a shoulder (160), and has been pre-heated, is immediately brought up around the catholyte cup (tape (146) being carefully folded in the process) until the shoulder (160) bears against the tubesheet periphery. The (preheated) upper casing "half" (169) which also has a flared and radiused rim (170), is immediately brought down around the anolyte cup (tape (147) being carefully folded in the process) until the rim (170) makes flush contact with the rim (159). The two casing halves are then joined by fusing rims (159) and (170) together, to form an equatorial bulge (178), defining a groove (unnumbered) in the side wall(s) of the casing (indicated generally as (181)) in which the peripheral portion of the tubesheet is "trapped". It is not necessary that a bond be formed between the tubesheet and casing. In fact, the tubesheet edge preferably is precoated with a non-fluxing lubricant, such as graphite, to prevent such bonding, thereby minimizing the likelihood of residual stresses on the completed joint.

The completed cell should be kept hot enough to maintain the catholyte (the sulfur, for example) molten. Otherwise, fiber breakage may occur. For this reason, assembly of a complete cell of the latter type may be deferred and done at the location where the cell will be used. However, a heating coil, powered by the battery itself or by a separate source of electrical power, may be used—in combination with an insulated container—to keep the cell hot while it is being transported.

Again, the distance between the casing and the anolyte and catholyte cups is, at all locations, substantially greater than the radial distance the tubesheet can move before its motion is arrested at the surface of the groove it is disposed in.

At this point, it is apparent that the cell of FIG. 4 can be modified so that the inner assembly is engaged with the casing at the bottom, rather than at the tubesheet periphery. This is done by passing the protruding mandrel end—which is not cut off in this embodiment—through, and in sealing engagement with, the casing bottom. The limp link at the top of the assembly is retained. The lower end of the mandrel serves the positive terminal of the cell and as a (sulfur) fill port. This modification is possible because the upper (non-conductive) end of the mandrel (the core) is engaged with the tubesheet and the weight of the assembly will not stress the fibers. To avoid substantial stressing of the fibers as a consequence of expansion by the lower (metallic) portion of the core, this portion is shortened. That is, the non-conductive portion is extended down to a level somewhat above the lower surface of the tape coil. Since alternative cathodic connecting means may readily be employed at the cell bottom, the mandrel may even be made entirely of a non-conductive material. The joint between the two casing sections can be made at the juncture between the top wall and the side walls, rather than as an equatorial joint, the inner assembly being lowered into place and engaged with the casing bottom before the upper end of the foil strip (the limp link) is connected to the terminal post in the casing top and the top is joined to the rest of the casing.

It is also apparent that in the cell of FIG. 4 substitution of a steel wool felt or wad, or a liquid metal, for at least the bottom limp link, would be facilitated by the fact that the catholyte is contained in a cup.

Definition of the Process Invention

The essential steps in the method of the present invention are those which are indispensable to forming a hollow fiber type, high temperature battery cell in which (1) an element of an inner assembly comprising the fibers is so engaged with (a wall of) a surrounding, fluid-tight casing that motion of the assembly within the casing is limited but said engagement does not hamper expansive/contractive motions of the assembly components, and (2) at least one of the electrical connections between the assembly and the casing terminals comprises a limp link.

Thus, the first essential step (I) is to provide an inner assembly comprising an element which is so incorporated therein and extends therefrom in such manner that is can be engaged with the casing so as to support and position the assembly therein, without thereby causing the assembly to otherwise contact the casing in a manner which imposes a stress on any element of the assembly or which will result in such stressing if thermally induced dimensional changes subsequently occur in the assembly. A second essential step (II) is to so engage the inner assembly with the casing. A third essential step (III) is to complete the necessary connections between the casing terminals and the anode and cathode of the inner assembly, by means of as many (one or two) limp links as are required.

Before the cell is put into use, such seals as are required to prevent contact of the anolyte and catholyte with each other or with the atmosphere external to the cell will be formed. Of course, this requirement is not novel to cells of the present invention. However, sealing may be an essential part of the operation in which the necessary engagement between the inner assembly and the casing is effected.

In the procedures described herein for assembling the cells of FIGS. 1–4, the essential steps I–III set out above may be identified as follows:

| Cell of FIG. # | Sequence of Essential Steps of Method of Invention | Corresponding Alphabetical Sequence Steps |
| --- | --- | --- |
| 1 | I | a through j |
|   | II | l and m |
|   | III | k and n |
| 2 | I | a through e and g through j |
|   | II | l, m and n |
|   | III | n |
| 3 | I | a through j |
|   | II | l, m and n |
|   | III | n |
| 4 | I | a through i, and o |
|   | III | k and n |
|   | II | l and m. |

It is apparent from the preceding tabulation that steps II and III may be carried out in whichever order is appropriate to the particular type of cell being assembled. That is, the method invention comprises step I followed by one of steps II and III and then by the other.

More precisely, the method of the invention may then be defined as:

A process for fabricating an essentially stress-free battery cell comprising a closed casing having two external electrical terminals and an inner assembly disposed within said casing and electrically connected to said terminals, said process comprising steps, I, II and III as defined below, in either of the sequences I, II, III or I, III, II;

I. providing, as said assembly, an assembly which includes (1) a plurality of hollow fibers adapted to function as the electrolyte/separator in a battery cell and (2) an element so incorporated in and extending from said assembly that it can be engaged with said casing to support and position the assembly therein without thereby causing the assembly to otherwise contact the casing in a manner which imposes a potentially damaging stress on any part of the assembly or which will result in such stressing if thermally induced dimensional changes occur in the assembly;

II. so engaging said element with said casing, and

III. forming a separate, electrical connection from each of said terminals to said assembly, at least one of the connections comprising a limp link.

Suitable materials of construction for the cells of the present invention are generally known to those skilled in the electrochemical arts. However, the material requirements for certain components of sodium/sulfur battery cells will be summarized.

Suitable materials for the cathodic current collecting means in the cell are otherwise suitable electrically conductive metals which can be fabricated as sheets of foil, screening or wires and, as such or when coated with carbon, $MoS_2$, molybdenum or chromium metal, etc., do not develop a high surface resistance on prolonged contact with molten sodium polysulfides. Exemplary of such metals are aluminum, aluminum alloys, stainless steels, molybdenum, iron, etc.

Suitable "limp link" materials for use in the present invention are electronically conductive liquids or are solids capable of being formed as a folded foil or soft wool which exhibits essentially no resistance to changes in shape or position. Also suitable are slurries or suspensions of conductive solid particles in liquids which are at least capable of ionic conduction.

Not only graphite or metals may be used in the latter manner, but also charge transfer complex compounds. U.S. Pat. No. 4,071,662 discloses the use of vinyl pyridine polymer/iodine charge transfer complexes as cathode components in lithium-iodine batteries. British Pat. No. 1,504,680 discloses charge transfer complexes between vinyl pyridine polymers and iodine which exhibit metallic type electrical conductivity and are stable up to temperatures of at least 350° C. It is essential that the liquid component of the slurry be chemically inert (as defined earlier herein) to the particulate component.

The electrical path through the limp link should not substantially decrease in conductivity or cross-sectional area upon prolonged operation of the cell. Therefore, in those cases where the link material is a solid article immersed in the catholyte (or anolyte), the surfaces of contact between the link and the rest of the connecting means comprising it should be inaccessible to and not detrimentally reactive with the surrounding catholyte (as when a foil is welded to an inner end of a terminal post. Also, such reaction as may occur elsewhere between the link surface and the catholyte should be self-limiting, so that the corrosion of the link does not proceed beyond formation of a surface layer of the resulting reaction product. It is of course necessary that a solid link be composed of a material which melts above the contemplated operating temperature of the cell.

Suitable solid link materials are conductive, readily deformed substances which are essentially inert to or self-passivating in contact with the catholyte (or anolyte). Metals which are ductile or which can be formed as sufficiently soft wools are preferred such materials, but graphite (wools) are also suitable—particularly when immersed in conductive liquids. Specific metals which may be employed as foils are aluminum or soft alloys of aluminum with cadmium, etc. According to U.S. Pat. No. 4,102,960, graphite may also be fabricated in the form of high strength, flexible foils.

As indicated above, whenever the contact between the limp link and the rest of the connecting means it is part of is not of such a nature as to prevent intrusion of a corrosive or poorly conducting liquid at the contact interface, such intrusion must otherwise be prevented (as by containing the catholyte in a cup) or the contacting surfaces must be able to maintain their conductivity in the presence of the liquid. Coating of metal contact surfaces with carbon, $MoS_2$ or molybdenum metal is helpful when conductivity must be maintained in the presence of sodium polysulfides.

Whether or not a particular type of conductive liquid will be suitable as a limp link depends on whether it will be in contact with the catholyte (or anolyte) and its reactivity with the same. Thus, relatively low melting, conductive metals or alloys may be employed as a limp link between the cathode terminal of a cell and the bottom of a metallic catholyte cup, even though they are not inert, provided that no substantial contact between the catholyte liquid (or vapors) and the linking liquid will occur. It is also necessary that the portions of the connecting means (the cup bottom, for example) and the terminal in contact with the liquid metal be essentially insoluble in and not detrimentally reactive with it.

Specific metals which are liquid and do not boil at the operating temperatures (~300°–360° C.) of sodium/sulfur cells, for example, are cadmium, galium, indium, potassium, sodium, thallium and tin. Mercury may be used at temperatures below ~357°, its boiling point. Although such metals, for one reason or another, are generally not very practical, their use, particularly in alloys—such as lead-tin solders, for example—is not ruled out.

Preferred as liquid components of slurries to be employed as limp link materials are relatively low-melting salts or weak bases or acids. Specific low melting salts are aluminum bromide (m.p. 97.5° C., b.p. ~263° C. @747 mmHg); aluminum iodide (m.p. 191° C., b.p. 360° C.); arsenic triiodide (m.p. 146° C., b.p. 403° C.); arsenic trisulfide (m.p. 300° C., b.p. 707° C.); bismuth tribromide (m.p. 218° C., b.p. 453° C.); bismuth trichloride (m.p. ~231° C., b.p. 447° C.); metabasic acid (m.p. 236° C.); boron trisulfide (m.p. 310° C.); boron pentasulfide (m.p. 390° C.); cadmium iodide (m.p. 387° C., b.p. 796° C.); chromium acetonyl acetate (m.p. 216° C., b.p. 340° C.) and galium iodide (m.p. 212° C., sublimes at 345° C.). Numerous other such salts, etc., are listed in the *Handbook of Chemistry and Physics;* The Chemical Rubber Co., Cleveland, Ohio; 45th edition, 1964–5. Particularly preferred for use in sodium/sulfur cells is sodium pentasulfide (m.p. ~252° C.). It will be recognized that some of the above-listed salts would react with the catholyte in an alkali metal/sulfur cell, but that fact does not render such salts unsuitable for use in other types of (hollow fiber) battery cells.

Although the foregoing molten salts are generally ion-conductive, they will exhibit only minimal sustained conductivities as slurry components under the existing potential drop available and a content in the slurry of about 25 weight percent or more of the electronically conductive particles will generally be required. Preferably, the solids content of the slurry will be as high as possible without loss of the fluidity which facilitates functioning of the slurry as a limp (readily deformed) link.

It is of course necessary, in designing a given cell wherein the limp link is or comprises a material which is liquid at the contemplated operating temperature, to consider whether or not that material expands upon solidifying and, if so, to ensure that such expansion can occur without detrimentally stressing the inner assembly or the casing. For example, the catholyte may be held in a cup, the bottom of which is conically convex and the limp link material disposed as a thin layer between the cup bottom and a conforming (and conductive) interior surface of the casing, in an amount which does not fully occupy the space between the conforming surfaces.

It is to be emphasized that only a quite thin layer of a liquid or slurry will be required to function as a limp link. (The thickness of the (powdered) metal layer (127) in FIG. 3A is exaggerated for the sake of clarity in the drawing.) It is only necessary that such a fluid link have a thickness somewhat greater than the maximum elongation of the inner assembly which will result when the cell is heated to its operating temperature.

It is not necessarily required that a liquid or slurry type link be isolated from or even immiscible with the catholyte. In fact, a lower, "dead" portion of the catholyte (or anolyte) itself may, in the form of a thin layer, serve, in admixture with conductive solid particles or fibers, as a limp link component. However, in all cases, it is essential that the liquid component be inert (as defined earlier herein) to such cell components (the catholyte, for example) as it will be in contact with under the operating conditions to be employed.

Suitable casing materials are those which are otherwise suitable and can be fabricated in the requisite shapes, are resistant to corrosion by the cell contents which make contact with the casing, and with which the requisite joints or seals can be effected. In those embodiments in which the casing itself constitutes part of the electrical pathway between one of the cell electrodes and a terminal, it is also necessary that the casing material be adequately conductive. In this case, it ordinarily will not matter if the interior surface of the casing forms a non-conductive or highly resistant layer on contact with the catholyte, since a bonded contact between the cathodic current collecting means and the subjacent portion of the casing wall can generally be provided (as above discussed).

Materials of the preceding general type are not necessarily limited to, but usually will be, metals, glasses or ceramics. Specific suitable casing materials are stainless steel, carbon steel, aluminum or aluminum alloys, graphite, steel which has been surface treated with aluminum powder at elevated temperatures, chrome or molybdenum plated steel and conductive or insulating ceramics.

Preferred among the latter materials are surface treated or coated steels, stainless steel or ceramic glasses.

Suitable anolyte and catholyte cup materials also are generally metals, glasses and ceramics. When an electrically non-conductive material, or one which develops a high surface resistance, is used as a cup, the cup itself of course cannot function as an electrical connecting means. A separate collecting means must then be provided or the cup surface must be coated with a material, such as carbon, $MoS_2$ or molybdenum or chromium metal, which resists formation of a poorly conducting surface layer.

Suitable mandrel/core materials are those which can be formed into elongated, generally tubular members of the requisite rigidity and are adequately resistant to the catholyte (or anolyte). Again, metals, glasses and ceramics are generally suitable for this purpose. Although the core may be electrically conductive and thereby function as part of a current collecting or connecting means, this is not essential, since use of a separate such means (i.e., a foil, for example) having a much higher surface area will usually be necessary. (In fact, once the mandrel has functioned as such, and if it is removeably incorporated in the fiber, foil, etc., bundle, it can be slipped out. Generally, however, it will be preferred not to do this.)

Suitable tubesheet materials are electrically non-conductive materials which have approximately the same thermal coefficient of expansion as the hollow fiber or tubule material (see U.S. Pat. No. 3,917,490; column 3, lines 48–55). The tubesheet material must of course be adaptable to at least one procedure by which a self-supporting, non-pervious disc of the material, having the fiber ends passing in sealing engagement through it, can be formed. Glasses and ceramics are known suitable tubesheet materials (see U.S. Pat. No. 3,672,995 and 3,917,490).

Suitable cation-conductive hollow fiber materials are disclosed in U.S. Pat. No. 3,672,995; 3,829,331 and 4,050,915. Other cation-conductive glasses and ceramics are disclosed in numerous patents, of which U.S. Pat. No. 4,002,807 is exemplary.

The present invention may also be practised with anion conductive fibers. According to K. H. Stern, *Glass-Molten Salt Interactions, Chemical Reviews,* Vo. 66, No. 4, July 25, 1966, oxide and hydroxyl anions are known to be mobile in glass at elevated temperatures and there is evidence which suggests that fluoride ion may also be mobile at temperatures below those required to melt feldspar-containing glasses.

The inherent advantages of the hollow fiber electrolyte/separator configuration are realized to a maximum extent with thin-walled, smaller diameter (hairlike) hollow fibers. On the other hand, it is difficult to spin uniform fibers having outer diameters of less than about 30 microns. Accordingly, fibers having outer diameters of from about 30 to about 1000 microns and wall thicknesses of from about 0.04 to about 0.1 of the outer diameter are preferred. However, hollow fibers having diameters as small as 7.5 microns are disclosed in U.S. Pat. No. 3,268,313 and glass capillaries having diameters of up to about 6500 microns would be expected to be subject to damage by thermal stressing, an inverse proportion to their wall thicknesses. Thus, hollow fiber type battery cells in which the capillaries size ranges from the smallest feasible diameters to about 6500 microns are considered within the ambit of the present invention.

An optional modification of cells of the types illustrated by FIGS. 1–3 is to provide sufficient space between the anolyte tank and casing to contain the material normally disposed around the outside of the fibers. By altering the position of the cell, this material (the catholyte, for example) may be drained out of its normal working locus before being allowed to solidify, thereby avoiding damage to the fibers. This option is the subject of an allowed, co-pending U.S. patent application, Ser. No. 789,610, filed Apr. 21, 1977, in the name of J. N. Anand as the inventor and entitled IMPROVED ALKALI METAL/SULFUR BATTERY.

The present invention is not limited to the specific cells of FIGS. 1–4, which are for purposes of illustration, and is limited only according to the following claims.

What is claimed is:

1. A battery cell in which the electrolyte/separator is in the form of a plurality of hollow fiber lengths and the cell is so constructed that high temperatures may be employed in its fabrication or use without subjecting the cell components to thermally induced stresses of such magnitude as to damage them, said cell comprising:
a casing which is fitted with electrical leads adapted to function as positive and negative terminals of the cell and has top, bottom and side walls; and
an inner assembly disposed in the casing and so engaged therewith that motion of the assembly therein is limited but motion of the assembly components as a result of thermally induced dimensional changes is not hampered, said assembly comprising
(a) an upper member having the general shape of a bell or an inverted cup, the bottom edge of which is sealingly engaged with a fluid-impervious, electrically inert, generally disc-like, tubesheet having opposed, generally horizontal, upper and lower faces, said upper member and the tubesheet together defining a tank, (b) a bundle of said fibers, in generally parallel array, spaced laterally apart, and each having an open end and a closed end and consisting of a fluid-impermeable, electronically non-conductive, but ion conductive, material; said fibers passing generally vertically through and being sealingly engaged with said tubesheet body in such disposition that their open ends are coincident with or adjacent to said upper tubesheet face and communicate with said tank, their closed ends depending from said lower face, (c) a first current collecting/distributing means disposed in but not filling the spaces between said fibers and joined by a first connecting means to one of said leads, (d) a second current distributing/collecting means joined to the other of said leads by a second connecting means and so located that, when said tank is substantially filled with a liquid, the latter distributing means is in contact with the liquid, at least one of said first and second connecting means comprising a limp, electrically conductive link, said casing and upper member being adapted to prevent fluid communication between the tank interior and the portion of the casing interior external to said assembly.

2. A cell as in claim 1 wherein said upper member comprises an upward extending, generally tubular portion which passes through and is sealingly engaged with the top wall of the casing and constitutes or contains said second connecting means, and said limp link is comprised in said first connecting means.

3. A cell as in claim 2 in which said upper member is electrically non-conductive, the upper end of said tubular portion is closed throughout and said second current distributing means comprises an electrical conductor disposed in said tank and extending within said tubular portion through said closed end thereof, in sealing engagement therewith.

4. A cell as in claim 1 in which the peripheral portion of said tubesheet protrudes from the assembly as a ridge and the adjacent portion of said casing side wall defines a conforming ledge or shoulder with which said ridge is slidingly engaged and which supports said assembly, each of said first and second connecting means comprises a limp link, and any other contact between said assembly and said casing is of such a nature as not to hamper expansive or contractive motion of or within said assembly, said tank being closed and containing a body of an anolyte which extends into and fills said fibers, and said casing being closed and containing a body of a catholyte in which said fiber bundle and said first current collecting/distributing means are immersed.

5. A cell as in claim 1 wherein said limp link is a curved or folded length of a conductive foil.

6. A cell as in claim 1 wherein said first connecting means comprises, as said limp link, a body of an electrically conductive liquid or slurry disposed at the bottom of said casing.

7. A cell as in claim 1 in which:

said first current collecting means comprises one or more sheets of a flexible, metal foil or gauze or a plurality of wires, disposed between successive rows of said fibers and extending from a level adjacent to said tubesheet to a level below the closed fiber ends, and said first connecting means comprises a laminated metal member, below the fiber bundle, in which the laminae consist of the sheet portions below the fibers and, disposed therebetween, in tight contact therewith, one or more metal tape lengths, so positioned that they do not touch the fibers and so that the lower tape edges, together with the lower sheet edges, define a generally continuous lower surface of said laminated member, the tape thickness and the fiber diameter and spacing being such that the fibers are not stressed as a consequence of said tight contact.

8. A cell as in claim 6 in which said first collecting means is disposed in and around said bundle as a roll of generally concentric wraps of foil, gauze or arrayed wires separated by radially successive rows of said fibers.

9. A cell as in claim 8 in which said laminated member, said wraps and the portion of said bundle below the tubesheet are disposed around a central, vertically aligned, core or mandrel which does not extend to the bottom of said casing.

10. A cell as in claim 9 in which said core extends into said tubesheet and is sealingly engaged therewith, the section of the core in contact with the tubesheet being electrically non-conductive.

11. A cell as in claim 10 wherein said non-conductive core section and said tubesheet together constitute a unitary body of essentially constant composition throughout.

12. A cell as in claim 8 wherein:

said wraps, fiber bundle and laminated member are disposed around a vertically aligned, central core or mandrel, and surrounded by a liquid impervious, close-fitting, metal sleeve, a metal disc is in coextensive contact with said lower surface and is edge-joined to the bottom of said sleeve, the disc and sleeve respectively constituting the bottom and wall of a liquid-tight cup, said core or mandrel includes an electrically non-conductive upper section extending into and sealingly engaged with said tubesheet and a lower, metallic section which extends down through said laminated body and disc and is joined to the disc by a weld bead defining the juncture of the disc with the protruding end of said core or mandrel, said protruding end is electrically connected, through a limp link, to one of said electrical leads, and said laminated member, said core or mandrel, said disc and the latter limp link together constitute said first connecting means.

13. A cell as in claim 8 wherein:

said wraps, fiber bundle and laminated member are disposed around a vertically aligned, hollow central core or mandrel and surrounded by a closely spaced, stiff, metal sleeve which is engaged at its lower edge with said laminated member, said mandrel or core is closed at each end, is engaged with and extends through said laminated member but does not extend to the casing bottom, and is essentially empty and fluid-tight, at least the portions of said wraps immediately above said laminated member are of an open or foraminous structure and said sleeve is pierced by a plurality of perforations, said sleeve extends further from said laminated member than does said core or mandrel, which in turn extends further from the laminated member than do said wraps, and said tank includes a protruding portion which is engaged with an adjacent wall of the casing and the bottom of said laminated member is electrically connected through a limp link, comprised by said first connecting means, to said one of said electrical leads.

14. A cell as in claim 10 wherein said non-conductive core section, said tubesheet and said upper member together constitute a unitary body of essentially constant composition throughout and said second current distributing means comprises an electrical conductor disposed in said tank and extending through the top of said upper member, in sealing engagement therewith.

15. A cell as in claim 10 in which:

said upper member is electrically non-conductive, said non-conductive core section is extended above said tubesheet, through said upper member and said casing top wall, in sealing engagement with each thereof, the latter extension being hollow, terminating in a closed, upper end and containing an electrical conductor which passes through and is sealingly engaged with said closed end, and the portion of said extension within said tank has a foraminous wall structure.

* * * * *